(Model.)
2 Sheets—Sheet 1.
A. O. CARMAN.
HARVESTER REEL.
No. 265,575.  Patented Oct. 10, 1882.
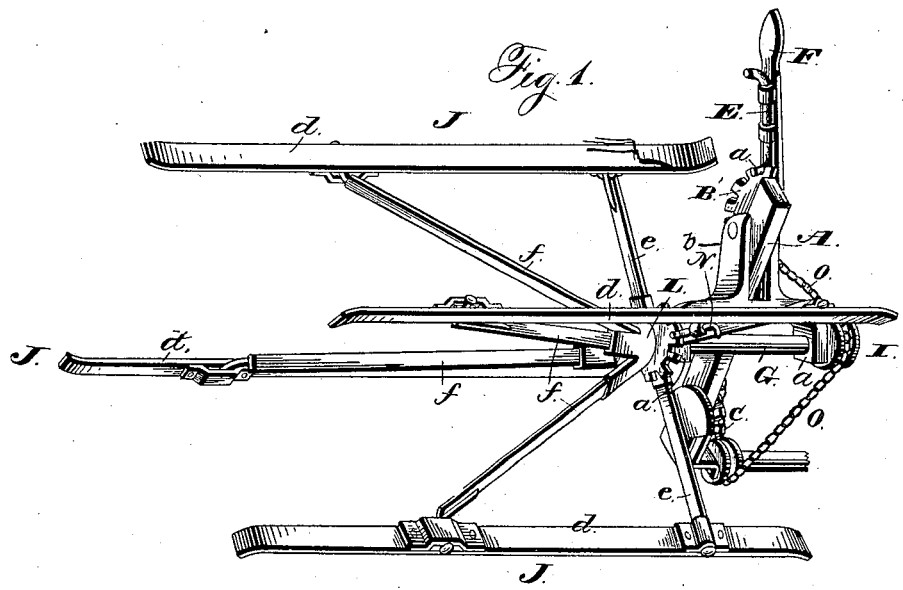
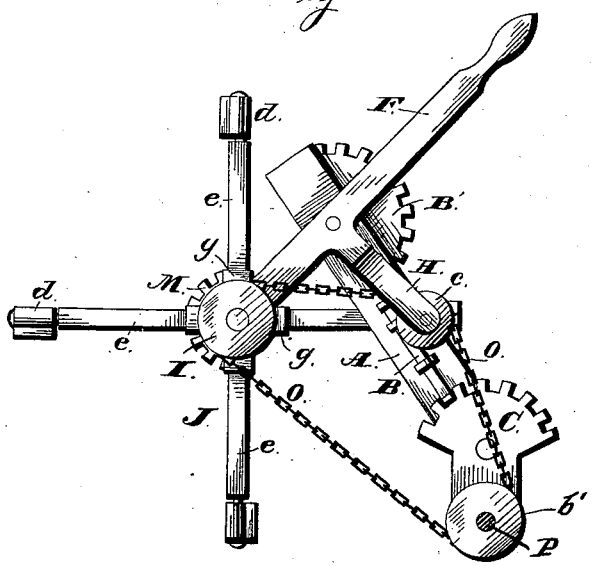
WITNESSES
Jas. E. Hutchinson
S. G. Nottingham
INVENTOR
A. O. Carman
By Leggett & Leggett
Attorney (Model.)

A. O. CARMAN.
HARVESTER REEL.

No. 265,575.   Patented Oct. 10, 1882.

WITNESSES
Jas. E. Hutchinson.
S. G. Nottingham.

INVENTOR
A. O. Carman
By Leggett & Leggett
Attorney

UNITED STATES PATENT OFFICE.

ALVIN O. CARMAN, OF POTTERVILLE, MICHIGAN.

HARVESTER-REEL.

SPECIFICATION forming part of Letters Patent No. 265,575, dated October 10, 1882.

Application filed May 5, 1882. (Model.)

*To all whom it may concern:*

Be it known that I, ALVIN O. CARMAN, of Potterville, in the county of Eaton and State of Michigan, have invented certain new and useful Improvements in Harvester-Reels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in harvester-reels, the object of the same being to provide a device capable of being elevated and lowered as desired.

A further object of my invention is to provide means for taking up the slack in the drive-chain when the reel is lowered.

A further object of my invention is to provide means for moving the reel forward or backward, so as to bring it in front of or over the grain-table.

A further object of my invention is to provide a reel capable of being twisted or inclined, so as to straighten up grain inclining toward or away from the grain-wheel; and with these ends in view my invention consists in certain details of construction and combinations of parts, as will be more fully described, and pointed out in the claims.

Figure 3:
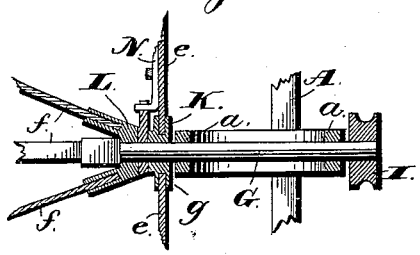
Figure 4:
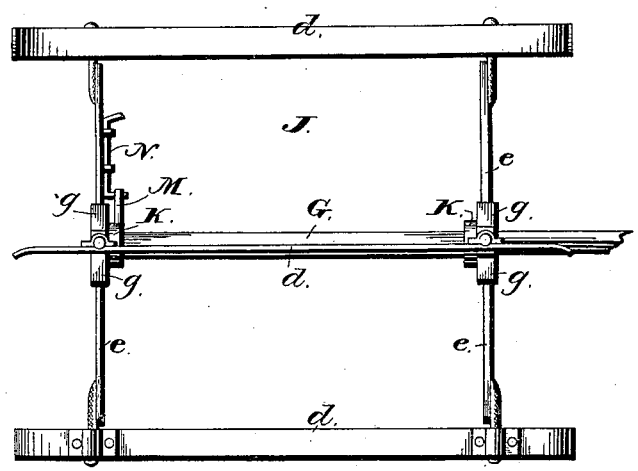

In the accompanying drawings, Figure 1 is a perspective view of my improvement. Fig. 2 is an end view of the same. Fig. 3 is a longitudinal sectional view taken through the axis of the reel, and Fig. 4 is a modification.

A represents the standard, pivotally secured in any suitable manner at its lower end to the machine, and provided with the sliding dog B, adapted to engage the segment-rack C, which latter is also rigidly secured to the machine at the side of the standard, and holds the said standard in any desired inclination. The upper end of the standard A is also provided with a segment-rack, B', with which the sliding dog E on the operating-handle F engages. The operating-handle or lever F is pivotally secured to the upper end of the standard A, and is provided on its outer ends with the arms $a$, which form the bearings for the reel-shaft G, and with the rearwardly-extending arm $b$, between which latter and the stem of the handle or lever the upper end of the standard A projects. The stem of the handle or lever F is also provided with the downwardly-extending arms H, between which the roller $c$ is journaled and which is adapted to take up or let out the slack band as the reel is lowered or elevated.

The reel-shaft G, as before stated, is journaled in the bearings $a$, and is provided on its outer end with the sprocket or pulley wheel I, over which the drive-chain passes and by which the wheel is turned. This reel J consists of the beaters $d$, the arms $e$, placed at right angles to the said beaters, and the diagonal braces $f$. The beaters $d$ are loosely secured to the outer ends of the arms $e$ and the braces $f$, and when the parts are in their normal positions the inner faces of the beaters pass the cutting-knives in a line parallel therewith.

K is a loose bearing situated on the shaft G, provided with as many recessed arms $g$ as there are beaters. The arms $e$ are secured in these recessed arms, and it is by means of this loose bearing that the twist in the reel is made. The extreme outer end of the shaft G is provided with a rigid socketed bearing, L, which latter is also provided with as many sockets as there are beaters. It is in these sockets that the diagonal braces $f$ are secured and through which the rigidity of the reel is obtained. As the bearing K is loose and the bearing L rigid on the shaft, it follows that by turning the loose bearing on the said shaft in one direction the relative positions of all parts of the reel are changed, and by turning it in the opposite direction the relative positions are again correspondingly changed. After the reel has been put in the desired operative position, or when the desired inclination has been given to the beaters, it is necessary to provide means for holding the parts against displacement; and to this end I have secured a segment-rack, M, on the shaft G, with which the dog N on the arm $e$ engages and holds the parts firmly together without any change of position until the dog N has been disengaged from the rack. When the grain stands in an upright position the reel need not be twisted, as there is no necessity therefor; but when the grain has been beaten down by storms and inclines toward either side of the machine it is essential that the same should be righted. If the grain should incline toward the grain-wheel, the reel is twisted so that the end of the beaters nearer the grain-wheel will approach the cutters first, and thereby gradually force the grain against the cutters. If the grain should incline in the opposite direction, the reel should be twisted in the opposite direction from that last described, so as to cause the ends of the beaters near the ground-wheel to approach the cutters first. By these means I am enabled to lay the grain perfectly straight on the table, which is very important where binding mechanism is attached to the harvester.

The drive-chain O is driven by the pulley-wheel $b'$ on the shaft P, and passes thence over the roller $c$ and wheel I. When the reel is in its highest position the pulley $c$ rests approximately in the same vertical plane with the pulley-wheel I and the shank of the lever inclines downward and backward. As the rear end of the lever is moved upward it lowers the pulley I and elevates the pulley $c$, both the pulleys moving in arcs of a circle. As the pulley I is lowered the pulley $c$ is elevated and moved backward, and as the chain slacks by the lowering of the pulley I the pulley $c$ takes it up and at all times holds the same in operative position.

In the modification shown in the drawings the shaft G extends throughout the entire length of the reel, and the diagonal braces are dipensed with, and instead thereof arms similar to the arms $e$ are used and rigidly secured to the shaft G. The same mechanism for holding the parts in a twisted position can be used with this construction and answer all the necessary purposes.

My invention is simple in construction, is durable and efficient in use, can be manufactured at a small initial cost, is easily manipulated, and is adapted for use with any ordinary construction of harvester or harvester and binder.

It is evident that numerous changes in the construction of the different parts might be resorted to without departing from the spirit of my invention; and hence I would have it understood that I do not limit myself to the exact construction of parts shown and described, but consider myself at liberty to make such changes as come within the spirit and scope of my invention.

I am aware that a harvester-reel has been mounted upon an arm pivoted to a pivoted standard, said arm and standard being provided with means of adjustment and also for taking up the slack of a belt or chain used for driving the reel; and I do not claim such devices or any of them, broadly. Neither do I claim a harvester-reel provided with devices for adjusting its blades obliquely, as such a reel was well known before my invention.

Having fully described my invention, what I claim as new, and desire to secure by Letters Patent, is—

1. The combination, with the standard provided with a segment-rack, of a lever provided with perforated arms forming bearings for the reel-shaft, projecting arms between which is journaled a roller adapted to regulate the slack of the driving band or chain, and with a sliding dog, substantially as set forth.

2. The combination, with a stationary segment-rack, of the reel-supporting standard, pivoted adjacent thereto and carrying a segment-rack at its upper end, a reel-supporting and operating lever pivoted to the upper end of said standard, and suitable dogs or detents attached to said standard and reel-supporting lever to engage with said segment-racks, respectively, substantially as and for the purpose set forth.

3. The combination, with the pivoted standard A, carrying a segment-rack at its upper end, of the stationary segment-rack C, the reel-supporting lever provided with bearings for the reel-shaft, and a segment-rack adjacent to one of said bearings, the reel-arms $e$ $e$, attached to a rocking bearing, and dogs arranged on the standard, reel-supporting lever, and one of the reel-arms, to engage adjacent segment-racks, substantially as described.

4. The combination, with the pivoted standard and the pulley $b'$ on the driving-shaft P, of the adjustable pivoted reel-supporting lever F, having the arm H, on which is pivoted the pulley $c$, the reel-shaft mounted on the end of the reel-supporting lever and provided with the pulley I, the driving chain or band, and means for holding the standard and lever in position, substantially as described.

In testimony that I claim the foregoing I have hereunto set my hand.

ALVIN O. CARMAN.

Witnesses:
HERMAN MORAN,
S. G. NOTTINGHAM.